United States Patent
Budesheim

[11] 3,710,944
[45] Jan. 16, 1973

[54] DEVICE FOR LIBERATING WATER OF MECHANICAL AND CHEMICAL IMPURITIES CONTAINED THEREIN

[76] Inventor: Heinrich Emil Budesheim, Berliner Strasse 15, Lohfelden, Germany

[22] Filed: July 15, 1970

[21] Appl. No.: 54,908

[30] Foreign Application Priority Data

July 18, 1969 Germany.................P 19 36 615.5

[52] U.S. Cl. ..................210/261, 210/262, 210/266
[51] Int. Cl..........................B01d 29/08, B01d 29/24
[58] Field of Search......210/259, 261, 262, 266, 282, 210/448, 452

[56] References Cited

UNITED STATES PATENTS

| | | | |
|---|---|---|---|
| 2,670,081 | 2/1954 | Quinn | 210/266 X |
| 3,561,602 | 2/1971 | Molitor | 210/266 |
| 3,366,240 | 1/1968 | Gruber | 210/448 X |
| 2,747,743 | 5/1956 | Talak | 210/452 X |

Primary Examiner—Samih N. Zaharna
Attorney—Hane, Baxley & Spiecens

[57] ABSTRACT

Water containing suspended mechanical impurities and also chemical impurities is liberated of such impurities by directing the water first through a mechanical filter trapping the mechanical impurities and then through a chemical filter removing the chemical impurities from the water.

The disclosed device comprises a generally cylindrical housing in which is mounted a sleeve made of a rigid water pervious filter medium, one end of the housing opening into one end of the filter. A container containing a chemical agent capable of removing the chemical impurities is in communication with the interior of the housing. The water to be liberated of impurities is first directed into the filter sleeve and after passing through the wall thereof flows from the housing into the container to pass the chemical filter therein. It is discharged through an outlet of the container now liberated of both types of impurities.

3 Claims, 4 Drawing Figures

PATENTED JAN 16 1973 3,710,944

INVENTOR:
HEINRICH EMIL BUDESHEIM

BY: Howe, Baxley and Sivuens

ATTORNEYS

DEVICE FOR LIBERATING WATER OF MECHANICAL AND CHEMICAL IMPURITIES CONTAINED THEREIN

The invention relates to a device for purifying water which contains chlorine containing substances and/or metallic compounds and/or manganese containing substances and further contains particles in suspension.

BACKGROUND

Water as it is supplied by water works often still contains impurities in spite of the filtering processes to which it has been subjected prior to being delivered to consumers. Such remaining impurities are generally due to the fact that the water on its way to the consumers passes through pipings the walls of which are often corroded. Moreover, there are more often than not mechanical impurities such as particles of all kinds present in the pipes.

Such chemical and/or mechanical impurities do not only reduce the quality of the water as made available to consumers but can also cause malfunctions of safety equipment and regulating devices incorporated in the water supply system. When water containing chemical impurities is flowing through copper pipes such pipes may be corroded or even disintegrated by electrolytic action within the pipes. Such action may be due to the presence of chemicals which react with the metal of the pipes so as to cause the electrolytic action which as is well known is highly damaging especially to copper pipes.

It is known to purify water by mechanical filters included in the pipe system prior to tap points of the system. Such filters usually comprise sleeves made of a suitable sintered synthetic plastic. Filters of this kind are generally capable of trapping suspended particles having a size in the order of about $15\mu$ and larger.

Chlorine containing substances, metal compounds and manganese containing substances cannot be removed from the water by mechanical filters as impurities of this kind generally have a particle size less than $15\mu$.

There are also known filters relying upon a dechlorination medium capable of removing the chlorine contained in the water. However, it has been observed that filters of this kind fail after a comparatively short time as the filter medium becomes clogged with the mechanical particles such as suspended fine grains of sand, and are thus no longer capable of removing the chlorine.

THE INVENTION

It is a broad object of the invention to provide a novel and improved device for liberating water from chlorine containing substances and/or metal compounds and/or manganese containing substances and also removing mechanical impurities such as solids and other particles suspended in the water.

SUMMARY OF THE INVENTION

The afore pointed out objects, features and advantages and other objects, features and advantages which will be pointed out hereinafter, are obtained by first guiding the water through a filter capable of trapping particles such as solids suspended in the water and then guiding the water, now liberated of mechanical impurities, through a second filter including a filter medium capable of removing from the water chlorine, substances containing metal and metal compounds. Such two-stage filtering of water to be purified assures that the chemical filter medium cannot be clogged by the mechanical impurities such as particles suspended in the water.

The chemical filter medium may comprise a dechlorination mass, for instance, a calcium sulfite of low solubility if the water is to be dechlorinated. In the event metal compounds such as ferric chloride, manganese containing substances or similar substances are to be removed from the water, sodium silicate may be advantageously used as a chemical filter medium. As a result, copper and other metal pipes through which water passes after having been subjected to the action of the chemical filter medium are protected against damage since the chemical filtering action eliminates or at least reduces to a minimum the formation of electrolytic reaction.

The device of the invention preferably comprises a generally cylindrical housing within which a filter sleeve is mounted, coaxially with the housing. The filter sleeve has a wall made of water pervious filter medium capable of trapping mechanical impurities suspended in the water. The interior of the sleeve is accessible through an inlet in one end of the housing. A container preferably directly mounted on the peripheral wall of the housing or integral therewith is in communication with the outside of the filter wall through openings in the bottom of the container and the wall of the housing. The container is at least partly filled with a suitable chemical filter medium and has an outlet so disposed that water must flow through the chemical filter medium before reaching the outlet of the container. In such purifying device the water is first compelled to flow into the filter sleeve and it is liberated of suspended mechanical impurities by passing through the filter wall. The now partly purified water then is compelled to flow through the chemical filter medium in the container. This medium is a dechlorination agent in the event the water is to be dechlorinated. If the water contains more metallic substances than acceptable such as manganese or metallic compounds, for instance, ferric chloride, sodium silicate may be used as chemical filter medium. Of course, the chemical filter medium may include several types of medium if this be desirable on the basis of the tests of the purity of water to be treated.

The filter sleeve in the housing may be made of a sintered synthetic plastic such as sintered polyethylene. A filter sleeve of this kind is capable of removing from the water suspended particles having a size of $15\mu$ and more.

It is particularly advantageous to provide at one end of the cylindrical housing an inlet flange the inner diameter of which is smaller than the inner diameter of the filter sleeve. The opposite end of the housing may be closed by a detachable closure cap to facilitate inspection of the filter sleeve for replacement or cleaning thereof, if necessary. The cap may also be used as carrier for the respective ends of the sleeve.

The purifying device according to the invention is preferably incorporated in the pipe so that the cylindrical housing is about horizontally located. This facilitates removal of the filter sleeve after detachment of the closure cap, for instance by unscrewing the same.

DETAILED DESCRIPTION OF THE INVENTION

In the accompanying drawing several embodiments of the invention are shown by way of illustration and not by way of limitation.

Figure 1:
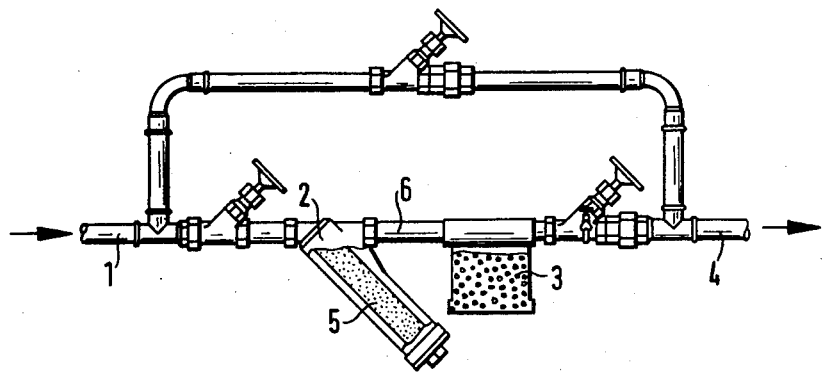
FIG. 1 is a diagrammatic elevational view of a purifying device installed in a pipe system.

Referring now to the figures more in detail, the water to be liberated of impurities of the kind described is delivered by a pipe 1 to a first filter 2. After passing through this filter it is fed through a pipe 6 to a second filter 3 and after passing through the second filter the now purified water flows off through a pipe 4.

Filter 2 serves to trap mechanical impurities such as particles suspended in the water. For this purpose the filter, which will be more fully described hereinafter, includes a filter sleeve made for instance of water pervious sintered polyethylene. The water first flows into the interior of the sleeve and then passes through the wall of the filter sleeve whereby the suspended impurities are trapped. The now partly purified water is discharged from filter 2 into pipe 6.

Filter 3 may contain a dechlorination agent as filter medium. Such agent is capable of dechlorinating the water. In the event it is desired to remove metallic substances or metal compounds from the water, sodium silicate may be used as filter medium. It is, of course, possible and within the concept of the invention to use several types of a chemical filter medium simultaneously.

Figure 2:
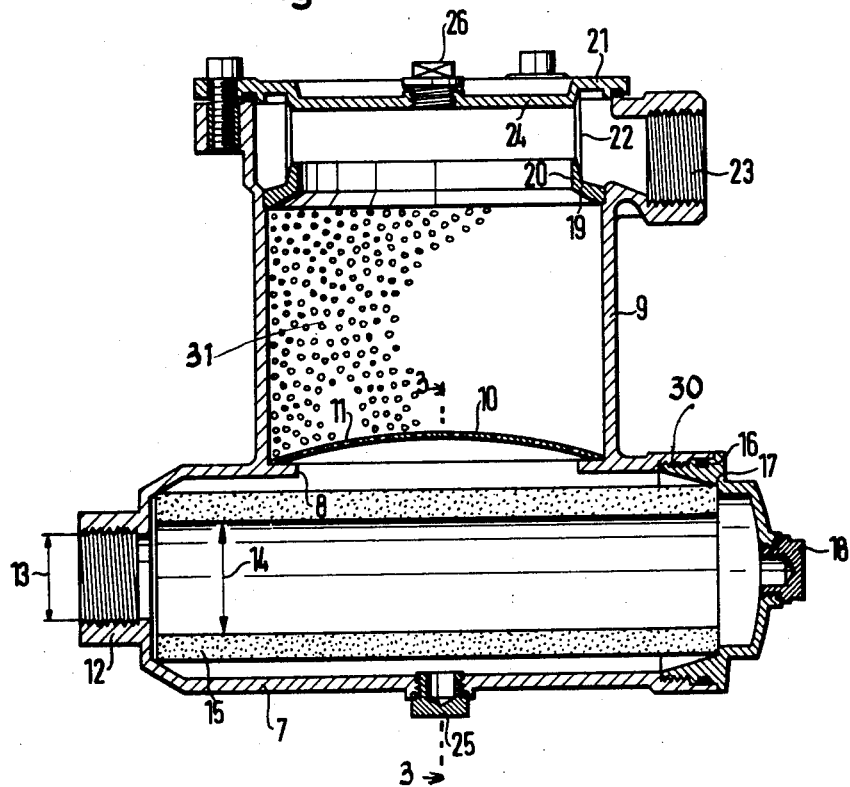
FIG. 2 shows in detail a sectional elevational view of a modification of the purifying device.
Figure 3:
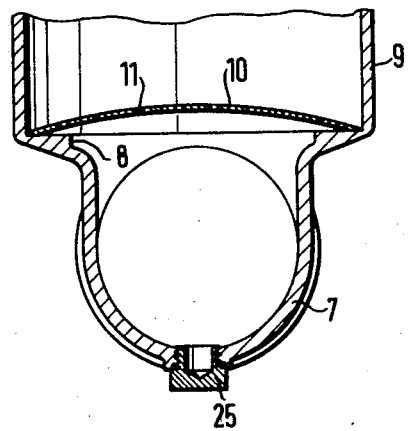
FIG. 3 is a section taken on line 3—3 of FIG. 2.

The purifying device of FIGS. 2 and 3, which is particularly advantageous for carrying out the method of the invention, comprises a generally cylindrical housing 7 which has in the upper part of its peripheral wall an opening 8. A generally cylindrical container 9 is secured to the housing so that the bottom wall 10 of the container is in registry with housing opening 8. Bottom wall 10 is perforated as it is indicated at 11. The container may be suitably secured to the housing, or it may be integral therewith as is shown. It is also possible to arrange the container separate from housing 7. It is only essential that the interior of container 9 is in communication with the interior of the housing 7 through the opening 8 therein. The cylindrical housing 7 has at one end an inlet flange 12 the inner diameter 13 of which is smaller than the inner diameter 14 of a filter sleeve 15 disposed within the housing coaxially therewith. This filter sleeve has a wall made of a water pervious substantially rigid filter medium capable of trapping suspended impurities above a selected minimum size such as 15$\mu$. Sintered polyethylene has been found to be a suitable filter medium for the filter sleeve.

The housing end opposite to inlet 12 is closed by a closure cap 16 detachably secured to the housing, for instance, by a threading as it is indicated at 30. Cutouts 17 may be provided to center the filter sleeve coaxially with the housing. A plug 18 in cap 16 permits inspection of the interior of sleeve 15 after removal of the plug by unscrewing the same.

Draining of the device may be effected by means of a detachable draining plug 25 and the device may be vented by removing or opening a venting plug 26.

As it is shown in FIG. 2, a peripheral edge of the outer wall of filter sleeve 15 abuts against the inner wall of housing 7 so that in effect inlet flange 12 and the filter sleeve are sealed to each other thereby compelling the entire flow of water directed into inlet 12 to enter the interior of the sleeve.

Container 9 is closed at its top by a cover 21, the mid-portion 24 is depressed as it is shown in FIG. 2. A ring or bracket 19 with an upwardly directed peripheral flange 20 is mounted within the container spaced apart from the cover. A water pervious sleeve 22 interposed between ring 19 and the cover is held in position by flange 20 and the depressed portion 24 of cover 21. The outside of sleeve 22 communicates with an outlet 23. The sleeve 22 can, of course, be mounted in the container by other suitable fastening means such as a plurality of circumferentially spaced protrusions on the inner wall of the container.

Container 9 is filled with a chemically acting filter medium 31, preferably up to about the level of ring 19. As previously explained, the filter medium is selected in accordance with the chemical impurities to be removed from the water. In the event that it is particularly essential to remove chlorine or chlorine containing substances, a dechlorination agent is used. Manganese containing substances or metal compounds may be removed by using sodium silicate as filter medium. As stated before, several types of a chemical filter medium may be simultaneously provided.

The device of FIGS. 2 and 3 as heretofore described, functions as follows.

Figure 4:
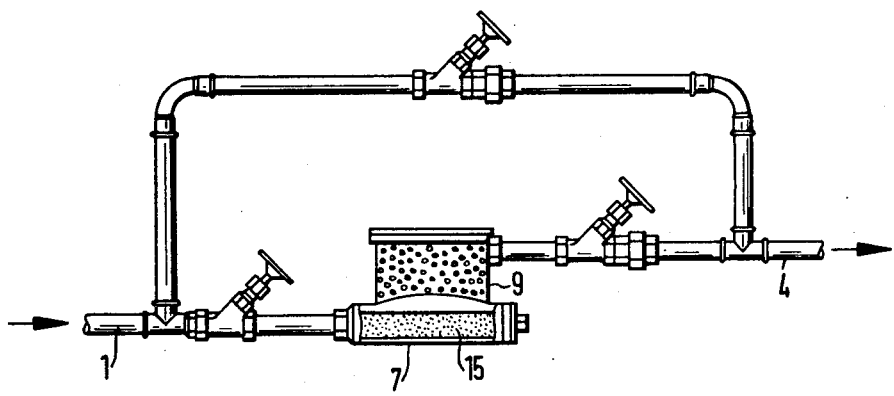
FIG. 4 is a diagrammatic view similar to FIG. 1 but showing the purifying device of FIGS. 2 and 3 installed into the pipe system.

Assuming that the device is included in a pipe system as shown in FIG. 4, the water to be purified flows through pipe 1 and inlet flange 12 into the interior of filter sleeve 15. As it passes through the wall of the filter the particles and other mechanical impurities entrained in the water are trapped and the now partly purified water flows via openings 11 through the filter medium 31 which removes the chemical impurities from the water. The now completely purified water is discharged from the device through water pervious sleeve 22 and outlet 23 of container 9. The sleeve 22 in conjunction with ring 19 prevents a flushing-out of the filter medium in the container.

The device according to the invention has the advantage that its construction is very simple and that the water is compelled to pass through the entire filter medium in container 9 after it has been liberated of mechanical impurities by passing through the wall of filter sleeve 15.

FIG. 4 shows the location of the device according to FIGS. 2 and 3 in a pipe system. The pipe system itself does not constitute part of the invention.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for liberating water of suspended impurities and of chemical impurities, said device comprising in combination:

an elongate housing having at one end an inlet for the water and closed at the other end;

a tubular filter mounted within said housing axially therewith and communicating with said inlet, the wall of said filter being made of a substantially rigid water pervious material capable of trapping suspended mechanical impurities;

a closed container communicating with the housing through openings in the container and the peripheral wall of the housing, said container having an outlet located spaced apart from the container openings, said container being attached at its bottom end to the peripheral wall of the housing in registry with the openings therein and being closed at its top by a detachable closure member, the bottom of the container including the openings thereof;

a filter medium capable of removing chemical impurities in the water, said filter medium being disposed within the container between the opening thereof and the container outlet; a support bracket mounted within the container spaced apart from the closure member, the filter medium in the container being disposed below said bracket, and a sleeve with a perforated wall interposed between said bracket and said closure member, said container outlet communicating with the outside of said sleeve.

2. The device according to claim 1 wherein said inlet of the housing has an inner cross sectional outline smaller than the inner cross sectional outline of the tubular filter and is coaxial therewith, said inlet and said filter being sealed to each other for directing the water to be treated into the interior of the filter.

3. The device according to claim 1 wherein said other end of the housing is closed by a detachable closure member supporting the respective end of the tubular filter.

* * * * *